Patented Feb. 10, 1931

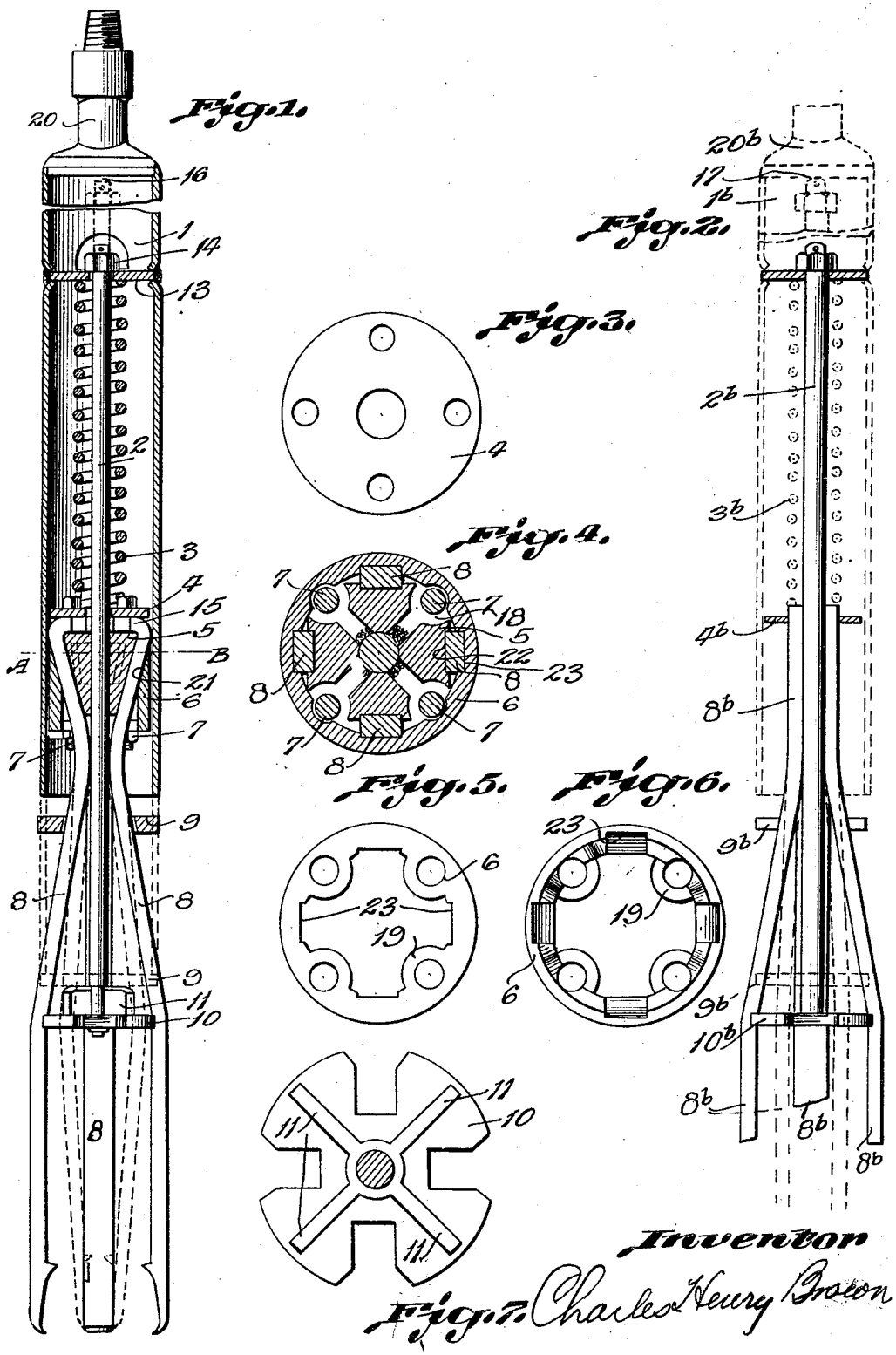

1,791,859

UNITED STATES PATENT OFFICE

CHARLES HENRY BROWN, OF BRECKENRIDGE, TEXAS

FISHING TOOL

Application filed May 11, 1928. Serial No. 277,083.

This invention relates to improvements in fishing tools for oil wells and the like and particularly to improvements on Patent Number 1,526,412 granted to me on February 17, 1925.

The object of this invention is the addition of certain novel features to those contained in Patent Number 1,526,412 in which the construction is much simplified and means is provided whereby repairs may more readily be made.

Another object of the invention is to provide a tool wherein it may have one or more fingers left off and thereby be suited to fish certain long or irregularly shaped objects that otherwise could not be fished.

Another object of the invention is to provide a tool wherein the central mandrel does not bump the top when the weight of the drill stem or pipe comes down to close it but in which the lower part of the mandrel shaft supports it by suspending the weight of the drill stem or drill pipe by taking the weight in tension of its lower end.

Another object is to provide a tool of greatly simplified and lower cost of manufacture.

This invention will be best understood from a consideration of the following detailed description, in connection with the accompanying drawings, nevertheless, it is to be understood that the invention is not confined to the disclosure being susceptible of such changes and modifications as shall define no material departure from the salient features of the invention as expressed in the appended claims.

In the drawings:—

Figure 1 is a partial sectional view of the invention as is now being presented.

Figure 2 is a partial sectional view of one form of the invention as was shown in Patent Number 1,526,412 of February 17, 1925, in which parts corresponding to ones in Figure 1 are numbered the same but carry the index b.

Figure 3 is a top view of clamping and guide plate 4.

Figure 4 is a sectional view of the clamping assembly as indicated by the line A—B in Figure 1.

Figures 5 and 6 are respectively a bottom and top view of clamping sleeve 6.

Figure 7 is a top view of the mandrel plate 10 with its gussets 11.

Referring to the drawings wherein for the sake of illustration is shown the preferred embodiment of the invention, the numeral 1 designates the body or tubular housing with its threaded connection 20, for attaching to a drilling stem and no change is made from that used with Patent Number 1,526,412.

The numeral 2 indicates the central mandrel shaft (or tube) to which is attached the finger assembly of the tool and which suspends that assembly in the tube 1 by means of the partition 13 and nut 14 which is threaded onto its top end. In Patent Number 1,526,412 this mandrel had the fingers attached solidly to it whereas in this application it carries the spider 5 which is rigidly fastened to it and the fingers 8 have hooks 15, that catch over the top end of the spider and are clamped to it by means of the clamping plate 4, the clamping sleeve 6 and bolts 7 etc.

The compression spring 3 prevents the tool from closing until it has received sufficient weight to make it sink into the mud or reach bottom and is the same as used in Patent Number 1,526,412.

The clamping and guide plate 4, the spider 5, the clamping sleeve 6 and the bolts 11, 11, 11, 11, form the means (after the spider 5 has been welded or otherwise securely attached to the mandrel) of assembling the several fingers 8, 8, 8, etc. to the mandrel which construction is new in this invention.

The closing plate 9 serves to close the fingers together by being forced down over their slanted portions by weight being applied to the body 1. This action is the same as in Patent Number 1,526,412.

The mandrel plate 10 which affords a base for closing the tool on top of objects being fished or on cavings, when the fingers cannot reach bottom and also serves as a guide to hold the fingers in regular spacing while being closed is the same as used in Patent Number 1,526,412 except that it has gussets 11, 11, 11, 11, etc. that are either cast integral or welded to it and to the mandrel 2. These gussets form the double means of bracing the mandrel plate 10 and of being a stop for the closing ring 9 when it has been pushed to its lowest position as shown by the dotted lines. By having the weight of and upon the descending body 1, supported by the closing ring 9 coming to rest on the gussets the top of mandrel shaft is prevented from bumping against the connection 20 and the shaft is not bent or its top upset as the lengths are so fixed that a space 16 is left between the connection 20 and the top of the mandrel whereas in Patent Number 1,526,412 the mandrel shaft 2b as shown in Figure 2 bumped the connection 20b as shown at 17.

In Figures 1 and 2 each have a finger left off in front to better show the construction. The method of closing the tools is shown by the dotted lines in Figure 1 below the section of the tube 1 and the dotting in of the closing ring and two fingers in each case.

The assembly of the fingers on the mandrel, formerly, was, as has been stated, by welding the fingers 9b rigidly to the mandrel with a guide ring 4b also welded on. In the present case the spider 5 is welded or otherwise rigidly attached to the mandrel 2, the clamping sleeve 6 and the closing plate 8 are slid on to the mandrel and the mandrel plate 10 with its gussets are fastened on to the mandrel 2. The several fingers are entered thru the closing plate 9 and clamping sleeve 6, one at a time and hooked over the top of the spider 5. The bolts 11, are then inserted thru the clamping plate 4, passing thru the clearance space 18 and sleeve 6. The bolts pull the plate 4 against the hooks 15 on the fingers and the sleeve 6 against their slanted portion 21 and as the fingers are each resting in the grooves 22 in the spider 5 and grooves 23 in the sleeve 6 they are held solidly and in alignment and that in case of a broken finger it can be removed and another finger attached with the use of ordinary wrenches. Also that if an object is of such size or shape or in such a position that one or more fingers need to be left off in order to more readily fish the job that can be done whereas in the Patent Number 1,526,412 the tool would require being taken to a shop for such repair or alteration.

It will also be seen that the fingers could be assembled rigidly enough for fishing most objects by making them without the hooks 15 and clamping them by their slanted portion 21 only.

I am acquainted with the fact that many fishing tools having demountable features have heretofore been made and therefore do not claim that feature broadly but only in the manner shown or mentioned therefore, I claim:

1. Improvements in a fishing tool, a barrel, a connection at the upper end of the barrel, a mandrel slidably mounted in the barrel, said mandrel carrying a set of flexible steel fingers with inwardly hooked and downward and inward slanted top ends which are assembled on the mandrel by a spider rigidly attached to the mandrel, a clamping plate resting on top of the hooked ends of the fingers and causing the hook on each finger to engage the top of the spider, a clamping sleeve that is pulled up on the slanted portions of the fingers, clamping the fingers securely in position, means for closing the fingers together at the bottom and holding them closed.

2. A fishing tool having a central mandrel upon which flexible fingers are assembled and having a mandrel plate at its bottom with gussets attached that brace the mandrel plate and act as a stop to the closing plate when it reaches the lowest desired point.

3. A fishing tool having flexible fingers removably attached to a central member in such a way that one or more fingers may be removed and the others used to fish irregularly shaped objects lying in difficult positions.

Signed at Breckenridge in the county of Stephens and State of Texas this 8th day of May, A. D. 1928.

CHARLES HENRY BROWN.